United States Patent [19]

Schläfer et al.

[11] Patent Number: 4,898,933
[45] Date of Patent: Feb. 6, 1990

[54] WATER-SOLUBLE FIBER-REACTIVE AMINOTRIAZINE AND VINYLSULFONE CONTAINING AZO DYESTUFFS HAVING CARBOXY- OR CARBAMOYL PYRIDINIUM GROUPS

[75] Inventors: Ludwig Schläfer, Kelkheim; Hartmut Springer; Reinhard Hähnle, both of Königstein/Taunus, all of Fed. Rep. of Germany

[73] Assignee: Hoechst Aktiengesellschaft, Frankfurt am Main, Fed. Rep. of Germany

[21] Appl. No.: 348,276

[22] Filed: May 5, 1989

Related U.S. Application Data

[62] Division of Ser. No. 115,435, Oct. 30, 1987, Pat. No. 4,861,344.

[51] Int. Cl.$^4$ .................. C09B 62/453; C09B 62/09; C09B 62/513; D06P 1/38
[52] U.S. Cl. .................................. 534/605; 534/606; 534/631; 534/634; 534/642; 534/617
[58] Field of Search ................ 534/605, 606, 631, 634

[56] References Cited

U.S. PATENT DOCUMENTS

| | | | |
|---|---|---|---|
| 4,323,497 | 4/1982 | Hoyer et al. | 534/634 X |
| 4,378,312 | 3/1983 | Hoyer et al. | 534/631 X |
| 4,453,945 | 6/1984 | Miyamoto | 534/634 X |
| 4,762,916 | 8/1988 | Schlafer et al. | 534/634 X |
| 4,808,193 | 2/1989 | Schlafer et al. | 534/631 X |

FOREIGN PATENT DOCUMENTS

| | | | |
|---|---|---|---|
| 235521 | 9/1987 | European Pat. Off. | 534/634 |
| 3601722 | 7/1987 | Fed. Rep. of Germany | 534/634 |
| 61-40367 | 2/1986 | Japan | 534/634 |
| 62-10168 | 1/1987 | Japan | 534/634 |
| 2065159 | 6/1981 | United Kingdom | 534/634 |

*Primary Examiner*—Floyd D. Higel
*Assistant Examiner*—Fiona Powers

[57] ABSTRACT

Water-soluble azo compounds having useful fiber-reactive dye properties conforming to the general formula

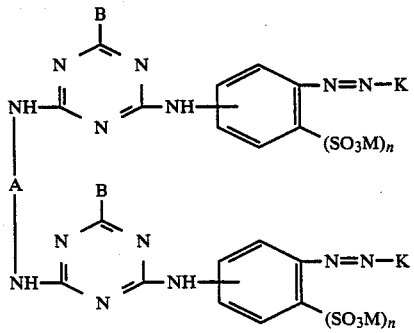

in which:
A is phenylene which may be substituted by lower alkoxy, lower alkyl, chlorine, sulfo and carboxy, or is a radical of the formula

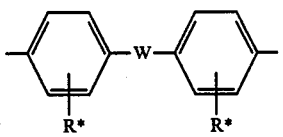

in which W is a direct bond or a radical of the formula —CH=CH— or —NH—CO—NH— and R* denotes hydrogen, nitro, sulfo, carboxy, methyl, ethyl, methoxy or ethoxy;
n is the number zero or 1;
B is a radical of the formula

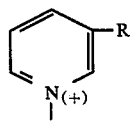

where R is equal to carboxy or carbamoyl;
M is hydrogen or an alkali metal;
K is a radical of the formula

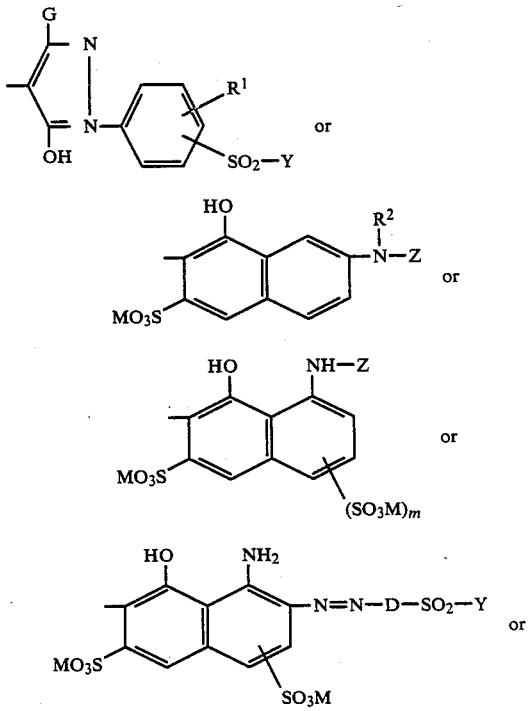

(Abstract continued on next page.)

-continued

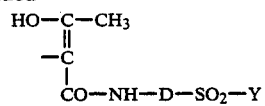

in which

D is phenylene which may be substituted by chlorine, bromine, lower alkyl, lower alkoxy, carboxy and sulfo, or unsubstituted or sulfo substituted naphthylene;

$R^1$ is hydrogen, chlorine, lower alkyl or lower alkoxy;

$R^2$ is hydrogen or lower alkyl;

G is carboxy, methyl or lower carbalkoxy;

Y is vinyl, β-sulfatoethyl or β-chloroethyl;

m is the number zero or 1;

Z is α- or β-bromacryloyl or β-chloropropionyl, β-chloroethylsulfonylbenzoyl or (β-chloroethylsulfonylmethyl)-benzoyl or a radical of the formula

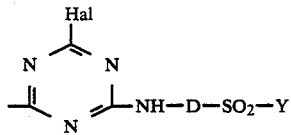

where D and Y have the abovementioned meaning and Hal is equal to chlorine or fluorine.

The compounds (1) produce fast dyeings on carboxamido- and/or hydroxy-containing materials, in particular cellulose fibers. On cellulose, fast dyeings are also obtained in a weakly acid to neutral medium, for example together with disperse dyes for dyeing a polyester fiber portion.

4 Claims, No Drawings

WATER-SOLUBLE FIBER-REACTIVE AMINOTRIAZINE AND VINYLSULFONE CONTAINING AZO DYESTUFFS HAVING CARBOXY- OR CARBAMOYL PYRIDINIUM GROUPS

This application is a division of our copending application Ser. No. 07/115,435, filed Oct. 30, 1987, now U.S. Pat. No. 4,861,344.

The present invention relates to the technical field of textile dyes.

At present, cellulose fibers and polyester fibers cannot be dyed together with one and the same dye in a uniform and level manner owing to their different chemical natures. One is forced to dye mixed materials of these two types of fiber, such as, for example, blend fabrics, in a two-stage process, namely first dye one of the fibers with the dye suitable for that type of fiber, then the other fiber with the dye suitable for that type of fiber, in each case under different process conditions. Such a procedure is necessarily laborious and in need of replacement. It has therefore been attempted to dye such blend fiber materials using a dye mixture comprising a fiber-reactive dye for dyeing the cellulose fiber portion and a disperse dye for dyeing the polyester fiber portion. However, this proceduure has appreciable disadvantages. The reason is that fiber-reactive dyes are customarily fixed on the cellulose fiber in an alkaline medium and disperse dyes, like to a certain extent the polyester fiber also, are customarily sensitive to alkali. The consequence is accordingly that, in fixing the fiber-reactive dyes in an alkaline medium, the disperse dyes which are present at the same time and in certain circumstances the polyester fibers also can be damaged.

It was thus an object to reduce or even to remedy these previously disclosed disadvantages, in particular since the dyeing of blend fabrics, such as, for example, those of cellulose and polyester fibers, is becoming increasingly important. There thus also exists an increased interest in dyes which facilitate the dyeing of such blend fabrics, in particular in fiber-reactive dyes which are capable of becomng fixed on the cellulose fiber in the nonalkaline range and, in addition, can be employed at very low dyeing temperatures.

For instance, German Offenlegungsschrift No. 2,634,308 and U.S. Pat. No. 4,300,902 propose that such blend fiber materials be dyed with dyes which contain one or more s-triazinyl groups having a quaternary nitrogen substituent, such as a pyridinium radical, for example nicotinic acid, and later, according to U.S. Pat. No. 4,453,945, dyes of the same type having specifically a nicotinic acid radical as quaternary nitrogen substituent have been used for dyeing cellulose fibers and cellulose/polyester blend fibers. However, these dyes and the dyeing methods used therefor have disadvantages. While the dyes of German Offenlegungsschrift No. 2,634,308 and U.S. Pat. No. 4,300,902 require dyeing temperatures of over 150° C., and by contrast the dyeing method of U.S. Pat. No. 4,453,945, according to its own statements, is feasible at dyeing temperatures below 150° C., the dyes mentioned in these three publications nonetheless have the serious disadvantage that their color yield, when used to dye cellulose fiber materials, such as cotton, by the exhaust method, is highly dependent on the pH value of the dye bath. Consequently, the depth of shade of dyeings with these known dyes on cotton fibers at pH values between 4 and 8 varies greatly, the general maxim being that the depth of shade increases with increasing pH and the maximum depth of shade, as with all conventional fiber-reactive dyes, is obtained in the strongly alkaline range, i.e. above(*). In addition, the buildup of dyeings with these dyes, i.e. the relation between amount of dye used and color yield obtained on the cellulose fiber (color strength or depth of a shade), is inadequate, since beyond certain concentrations of dye in the dye bath the color yield on the fiber does not increase further as the amount of dye is increased to obtain deeper shades.

(*) a pH of 9 or even 10.

These defects are also found with the dyes described in European patent application Publication No. 0,167,219A, which, in addition to a pyridinium-substituted s-triazinyl radical, contain a fiber-reactive group of vinylsulfonyl type.

The present invention now provides new water-soluble compounds which conform to the general formula (1) mentioned and defined hereinafter, have fiber-reactive properties and cannot only be used with advantage for dyeing cellulose fibers in the alkaline range but, surprisingly, are capable of becoming fixed on cellulose fibers even in the weakly acid and neutral range, namely under conditions of the so-called high-temperature neutral dyeing method (HTN method) at temperatures between 100° and 150° C. and at a pH value between 4 and 8 in an aqueous medium, i.e. under the conditions of dyeing polyester fibers. By providing the new dyes of the general formula (1) it has become possible to use the hitherto usual and customary disperse dyes together with these new dyes in one-stage dyeing processes for dyeing cellulose/polyester fiber blends in which the two fiber components are dyed uniformly and fast by the respective type of dye and it is possible to obtain tone-on-tone dyeings if the disperse dye used has the same shade as the fiber-reactive dye. The novel fiber-reactive compounds have the general formula (1)

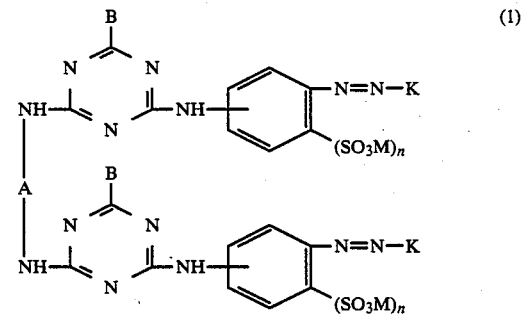

in which the various symbols have the following meanings:

A is a phenylene radical, preferably a para-phenylene radical, which can be substituted by 1 or 2 substituents from the group consisting of alkoxy of 1 to 4 carbon atoms, such as methoxy and ethoxy, alkyl of 1 to 4 carbon atoms, such as methyl and ethyl, chlorine, sulfo and carboxy, preferably by a sulfo group, or A is a radical of the general formula (2)

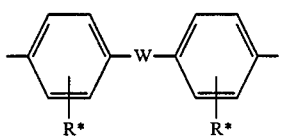 (2)

in which

W is a direct bond or a vinylidene radical of the formula —CH=CH— or a bivalent urea radical of the formula —NH—CO—NH— and R* in both instances, which can be identical to or different from each other, are preferably identical to each other, denotes a hydrogen atom or a sulfo, carboxy, methyl, ethyl, methoxy or ethoxy group, preferably a sulfo group;

B is a pyridinium radical of the general formula (3)

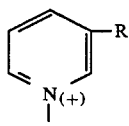 (3)

in which

R is a carboxy group or a carbamoyl group;

M is a hydrogen atom or an alkali metal, such as sodium, potassium or lithium;

n stands for the number zero, 1 or 2 (where in the case of n being 0 this group denotes a hydrogen atom);

K is a radical of the general formula (4), (5), (6), (7) or (8)

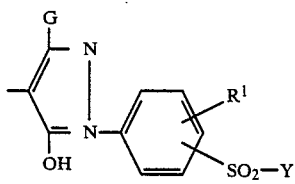 (4)

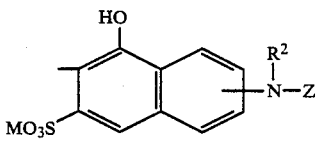 (5)

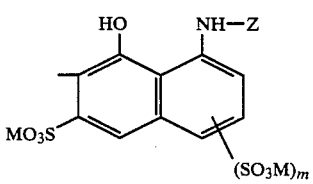 (6)

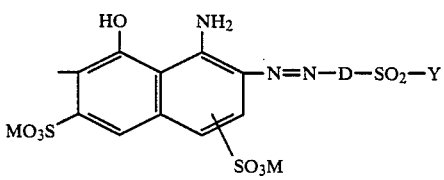 (7)

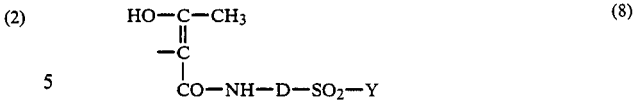 (8)

in which

D is a phenylene radical which can be substituted by 1 or 2 substituents from the group consisting of chlorine, bromine, alkyl of 1 to 4 carbon atoms, such as methyl, alkoxy of 1 to 4 carbon atoms, such as methoxy and ethoxy, carboxy and sulfo, or is a naphthylene radical, such as in particular a naphthylene radical which is bonded in the 2-position to the azo group, which can be substituted by 1 or 2 sulfo groups;

$R^1$ is a hydrogen atom, a chlorine atom, an alkyl group of 1 to 4 carbon atoms, such as the methyl group, or an alkoxy group of 1 to 4 carbon atoms, such as a methoxy group, but preferably a hydrogen atom;

$R^2$ is a hydrogen atom or an alkyl group of 1 to 4 carbon atoms, such as preferably a methyl group;

G is a carboxy, methyl or carbalkoxy group of 2 to 5 carbon atoms, such as a carbomethoxy or carbethoxy group, preferably a methyl or carboxy group;

Y is a vinyl, β-sulfatoethyl or β-chlorethyl group, preferably a vinyl and in particular a β-sulfatoethyl group;

M has the abovementioned meaning;

m stands for the number zero or 1 (where in the case of m being 0 this group denotes a hydrogen atom); the —$SO_3M$ group in the formula (6) is bonded in the meta or para-position relative to the —NH—Z group;

Z is an α- or β-bromacryloyl radical or a β-chloropropionyl, β-chloroethylsulfonylbenzoyl- or (β-chloroethylsulfonylmethyl)-benzoyl radical or a radical of the general formula (9)

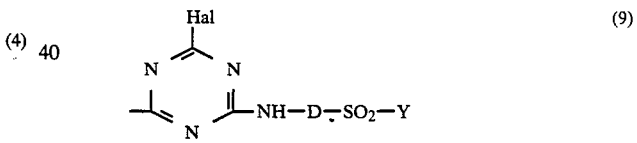 (9)

in which D and Y have the abovementioned, in particular preferred meanings, and Hal stands for a chlorine or a fluorine atom, preferably a chlorine atom;

one of the sulfo, sulfato and carboxy groups forms an anion equivalent to the pyridinium cation.

The individual symbols in the formulae can have meanings identical to or different from one another. In particular those symbols which appear twice in the formula can have the same meaning in both cases or a different meaning in each case; preferably, B, R', M and K pairs have in each case the same meaning.

In the general formulae (7), (8) and (9), D is preferably an unsubstituted phenylene radical or a phenylene radical substituted by the substituents mentioned for this purpose. The fiber-reactive group of the formula —$SO_2$—Y in the general formulae (4), (7), (8) and (9) is preferably bonded to the benzene nucleus in the meta-or para-position relative to the nitrogen atom of the pyrazolone or of the amino, azo or amide group.

Heretofore and hereinafter, sulfo groups denote groups conforming to the general formula —$SO_3M$ where M has the abovementioned meaning, and carboxy groups denote groups of the general formula —COOM and sulfato groups groups of the general formula —OSO3M, in each case with M of the abovementioned meaning.

The azo compounds according to the invention can be present in the form of their free acid and preferably in the form of their alkali metal salts, in particular the neutral salts. They are preferably used in the form of these salts for dyeing and printing hydroxy- and/or carboxamido-containing fiber materials.

A is preferably an unsubstituted or sulfo-substituted p-phenylene radical, a 2,2'- or 3,3'-disulfodiphen-4,4'-ylene radical or a radical of the formula (10a), (10b) or (10c)

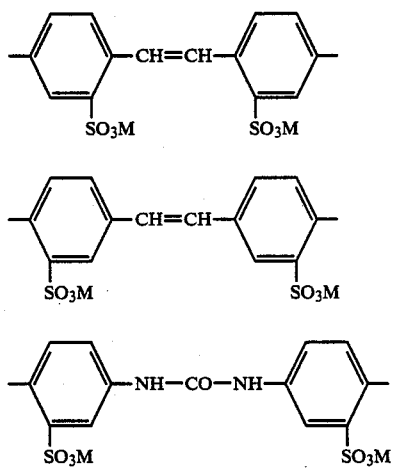

where M has the abovementioned meaning. Of the K radicals, preference is given to the 1-(4'-β-sulfatoethylsulfonyl)-phenyl-3-methyl and -3-carboxypyrazol-5-one radical and further to the 6- and 7-(3'-β-chloroethylsulfonyl)-benzoylamino-3-sulfo-1-hydroxynaphth-2-yl radical, the 6- and 7-(4'-β-chloroethylsulfonylmethyl)-benzoylamino-3-sulfo-1-hydroxynaphth-2-yl radical, the 8-(3'-β-chloroethylsulfonyl)-benzoylamino-3,6-disulfonaphth-2-yl radical, the 6-[2'-(3''-β-sulfatoethylsulfonylphenylamino)-4'-chloro-s-triazin-6'-yl]-amino-3-sulfo-1-hydroxynaphth-2-yl and the 8-[2''-(3'-β-sulfatoethylsulfonylphenylamino)-4''-chloro-s-triazin-6''-yl]-amino-3,6-disulfo-1-hydroxynaphth-2-yl radical.

Of the azo compounds according to the invention, emphasis can be given in particular to those which conform to the general formula (1a)

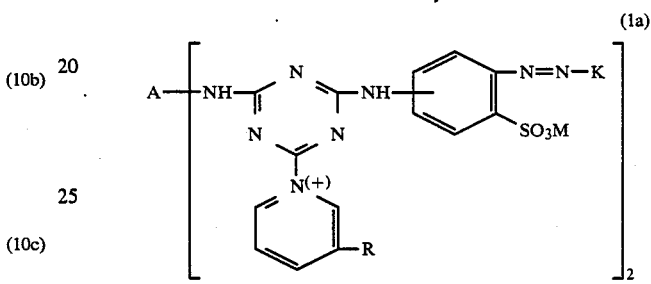

in which M and R have the abovementioned meanings, A stands for a 1,4-phenylene or 2,2'-disulfostilben-4,4'-ylene radical and K denotes a radical of the general formula (11a), (11b) or (11c)

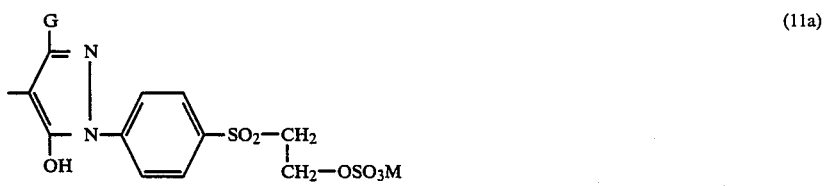

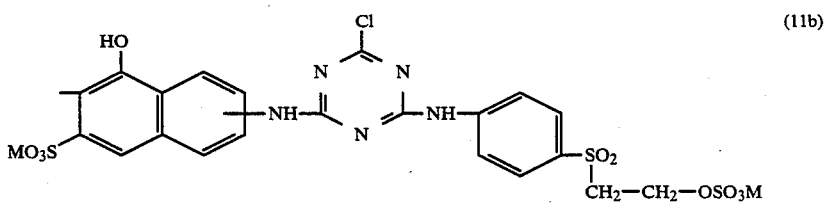

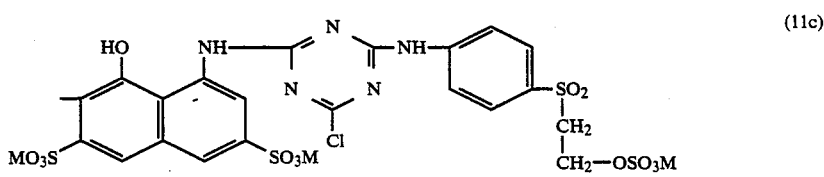

where M has the abovementioned meaning. Furthermore, the sulfophenylamino radical bonded to the azo group and the triazine radical is peferably a radical of the general formula (10d)

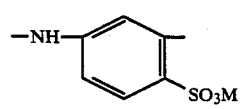

in which M has the abovementioned meaning and G stands for a methyl or carboxy group and in the formula (11b) the chlorotriazinylamino grouping is bonded in the 6- or 7-position of the 1-hydroxy-3-sulfonaphthyl radical.

The present invention further relates to processes for preparing azo compounds of the general formula (1). These comprise (a) doubly diazotizing (tetrazotizing) an aromatic amino compound of the general formula (12)

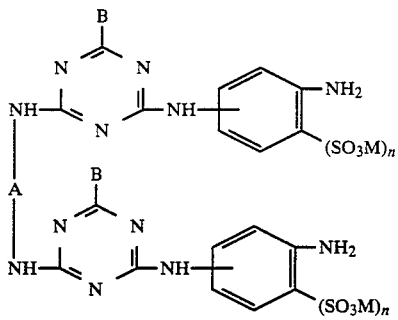

(12)

in which A, B, M and n have the abovementioned meanings, and coupling with a coupling component of the general formula (13)

H—K  (13)

in which K has the abovementioned meaning, or with two different coupling components of the general formula (13) in an equivalent amount, or (b) reacting a disazo compound of the general formula (14)

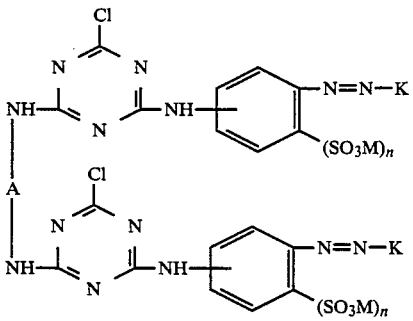

(14)

in which A, K, M and n have the abovementioned meanings, with nicotinic acid or nicotinamide.

The procedures according to the invention for preparing the novel azo compounds (1) can be carried out analogously to the process measures and conditions customary and known for the particular type of reaction. Such process measures are for example mentioned for process variant (b) in previously cited European patent application publication No. 0,167,219A; preferably, the reaction takes place in an aqueous medium at a pH value between 4 and 6, in particular between 4 and 5, and preferably at a temperature between 60° and 100° C., preferably between 80° and 90° C.

In the case of process variant (a) according to the invention, the diazotization (tetrazotization) and coupling are likewise carried out in accordance with long-established and customary procedures, for example the diazotization by reaction with nitrous acid in an aqueous acid medium, for example at a temperature between −5° C. and +10° C. and at a pH value between 0 and 2, and the coupling reactions for example in aqueous medium at a temperature between −5° C. and +30° C. and at a pH value between 3 and 8, preferably 3 and 7.

The starting compounds of the general formula (12) themselves can be prepared in a manner according to the invention by reacting a compound of the general formula (15)

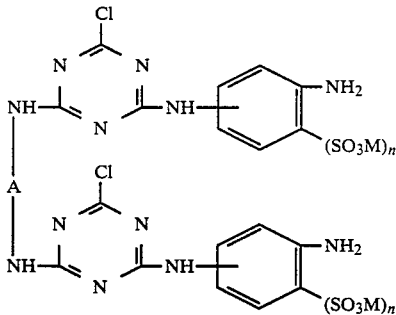

(15)

in which A, M and n have the abovementioned meanings, with nicotinic acid or nicotinamide, for example in aqueous medium at a pH value between 4 and 8 and at a temperature between 60° and 110° C.

The starting compounds of the general formula (14) can be prepared in a conventional manner by reacting chlorotriazine with an aminoazo compound of the general formula (16)

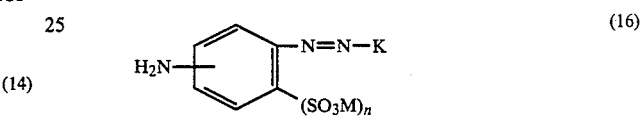

(16)

in which K, M and n have the abovementioned meanings, and with a diamino compound of the general formula $H_2N-A-NH_2$, in which A has the abovementioned meaning.

The starting compounds of the general formula (15) can be prepared in a similar manner be reacting chlorotriazine with a phenylenediamine compound of the general formula (17)

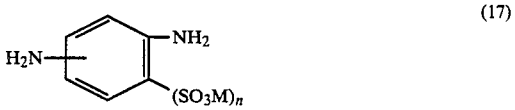

(17)

in which M and n have the abovementioned meanings, and with a diamino compound of the general formula $H_2N-A-NH_2$, in which A has the abovementioned meaning.

The condensation reactions of chlorotriazine with the amino compounds of the general formulae (16), (17) and $H_2N-A-NH_2$ are effected by the customary procedures as described in the literature for the reaction of chlorotriazine or of dichlorotriazinylamino compounds with amino compounds, for example in an aqueous or aqueous organic medium (the organic component preferably being acetone, toluene and ethylene chloride), at a pH value between 2 and 6 and at a temperature between 20° and 60° C. The starting compounds which are used for preparing the compounds according to the invention are described in large numbers in the literature or can be prepared analogously to those compounds described in the literature from corresponding analogous precursors. For instance, the starting amino compounds of the general formulae (7) and (12) are easily synthesized by the procedures described in German patent specification No. 485,185.

The precipitation and isolation of the compounds of the general formula (1) prepared according to the invention from the synthesis solutions is carried out in a conventional manner, for example by precipitating from the reaction medium by means of electrolytes or by evaporating the reaction solution, for example by spray drying, if desired after buffer substances have been added to the synthesis solution.

The compounds according to the invention have dye properties. As a consequence of the fiber-reactive groups they possess, they can also be used as fiber-reactive dyes. They can be employed in customary and known methods of applying and fixing fiber-reactive dyes on hydroxy-containing and/or carboxamido-containing materials, in particular fiber materials, for dyeing (including printing), for example, wool, synthetic polyamide fibers, but in particular cellulose fiber materials, such as cotton. These methods have been described in large numbers in the trade literature, including the patent literature, for example in German Offenlegungsschrift No. 3,440,265.

The present invention thus also relates to the use of the compounds according to the invention for dyeing (including printing) hydroxy-containing and/or carboxamido-containing materials, in particular fiber materials, and to a process for dyeing (including printing) such materials where a compound according to the invention is applied to the material, preferably from an aqueous solution, and fixed on the material by means of heat and/or by means of an acid-binding agent—in the case of dyeing hydroxy-containing materials preferably at a pH value between 8 and 11 and at a temperature between 15° and 120° C., preferably between 20° and 80° C.

The compounds according to the invention in addition have the great advantage, as mentioned at the beginning, that they are capable of dyeing hydroxy-containing fiber materials, such as cellulose fiber materials, from an aqueous liquor, preferably in an aqueous dye bath, by an exhaust method, even in the weakly acid pH range of 5 and greater than 5, such as at a pH value between 5 and 7, i.e. surprisingly in the absence of alkaline substances, but if desired in the presence of a customary acid-binding buffer mixture for setting and maintaining the pH range and if desired in the presence of customary dyeing assistants, at a temperature between 100° and 150° C., preferably at a temperature of 120° to 135° C., and become fixed on these materials to a high level of fastness. Such buffers are for example aqueous solutions of phosphoric acid/sodium phosphate and acetic acid/sodium acetate.

Under these dyeing conditions, which are known per se (see German Auslegeschrift No. 2,835,035) and which essentially correspond to the dyeing conditions of dyeing polyester fibers or other synthetic fibers, such as cellulose triacetate fibers, with disperse dyes, it is possible to dye advantageously cellulose blend fiber materials, such as cellulose/cellulose triacetate fiber and cellulose/polyacrylonitrile fiber and in particular cellulose/polyester blend fiber materials, with a customary disperse dye at the same time and together with a fiber-reactive dye, namely an azo compound according to the invention, from a common aqueous dye liquor without the otherwise existing danger of damaging the disperse dye or the synthetic fiber, such as polyester fiber, in a one-stage process, and if desired tone-on-tone, to give uniform and fast results.

The present invention thus also relates to a process for dyeing blend fiber materials of cellulose and synthetic fibers, preferably cellulose/polyester fiber blends, with one or more disperse dyes and one or more dyes according to the invention by action of these dyes on the fiber material from an aqueous dyeing liquor, preferably from an aqueous dye bath, at a temperature between 100° and 150° C., preferably at a temperature of 120° to 135° C., and at a pH value between 4 and 8, if necessary between 5 and 7.5, preferably between 5 and 7.

Using this dyeing method according to the invention, the synthetic fibers, such as polyester fibers, are dyed by the disperse dye and the cellulose fibers by the fiber-reactive azo compound according to the invention in the desired high quality (without the synthetic fiber, such as a cellulose triacetate or polyester fiber, being stained by the azo compounds according to the invention). The quality of the dyeing on the synthetic fibers is contingent upon the disperse dye and corresponds to the state of the art. Surprisingly, the cellulose fiber materials which are dyed with the azo compounds according to the invention under these conditions of dyeing with disperse dyes not only have a bright shade but considerable fastness properties (these fastness properties are present in any case when the azo compounds according to the invention are applied to the cellulose fiber materials in the alkaline range by the customary methods of applying and fixing fiber-reactive dyes). Of the good performance and manufacturing fastness properties, in particular the good light fastness properties not only of the dry but also of the moist cellulose dye which has been impregnated with tap water or an alkaline perspiration solution, and also of the wet fastness properties, in particular the good wash, water, seawater, cross-dyeing and perspiration fastness properties and the good acid fading resistance and likewise good pleating, hot press, crock and sublimation fastness properties have to be singled out of dyes of cellulose fiber materials which are obtained with the azo compounds according to the invention, not only by applying methods for fiber-reactive dyes in the alkaline range, but also by applying dyeing methods for disperse dyes.

The Examples which follow serve to illustrate the invention. The parts and percentages are by weight, unless otherwise stated. Parts by weight relate to parts by volume as the kilogram relates to the liter.

The compounds written in the Examples in the form of formulae have been written in the form of free acids; in general, they are prepared and isolated in the form of their alkali metal salts and used for dyeing in the form of these salts. In the same way, the starting compounds and components mentioned in the Examples, in particular Table Examples, in the form of the free acids can be used in the synthesis as such or in the form of their salts, preferably alkali metal salts, such as sodium or potassium salts.

The absorption maxima ($\lambda_{max}$ values) mentioned in the Examples for the azo compounds according to the invention in the visible range were determined on their alkali metal salts in aqueous solution.

EXAMPLE 1

To 74 parts of cyanuric chloride in aqueous suspension is added, with stirring, a neutral solution of 75.3 parts of 1,3-diaminobenzene-4-sulfonic acid at 0° to 5° C.; the pH is allowed to decrease to less than 1, and the batch is subsequently stirred for a further 90 minutes at that pH value below 1 and at a temperature of 0° to 5° C. 21.6 parts of 1,4-diaminobenzene are then gradually added to the reaction mixture, which is subsequently stirred for 30 minutes and then brought to a pH value of 5.5 in the course of 90 minutes, and the reaction batch is gradually heated to 40° to 50° C. and stirred at that temperature for a further 3 hours while a pH value of 5 to 5.5 is maintained. Toward the end of the second condensation reaction, the pH value is adjusted to 7, and the reaction product dissolves.

The batch is cooled down to about 10° C., is mixed with 52.5 parts by volume of 39% strength aqueous sodium nitrite solution and is diazotized in a conventional manner by gradual addition to a mixture of 150 parts by volume of concentrated hydrochloric acid and 1,000 parts of ice. After further stirring for about 30 minutes, 10% of sodium chloride, based on the volume of the diazonium salt suspension, are added, the batch is subsequently stirred for 3 hours in the presence of a small excess of nitrite, and excess nitrite is then destroyed by means of sulfamic acid. The coupling reaction takes place by addition of a neutral aqueous solution of 127.6 parts of 3-methyl-1-(4'-β-sulfatoethylsulfonyl)-phenyl-5-pyrazolone at a pH value of 5 to 6. To the resulting suspension are added about 600 parts of water, the suspension is brought to a pH value of 4 to 4.5 by means of acetic acid, 74 parts of nicotinic acid are added, and the batch is refluxed for 2 hours while the pH value of 4 to 4.5 is maintained. The batch is subsequently clarified (for example by means of diatomaceous earth and filtration) and evaporated.

The result obtained is an electrolyte-containing yellow powder of the alkali metal salt of the compound of the formula

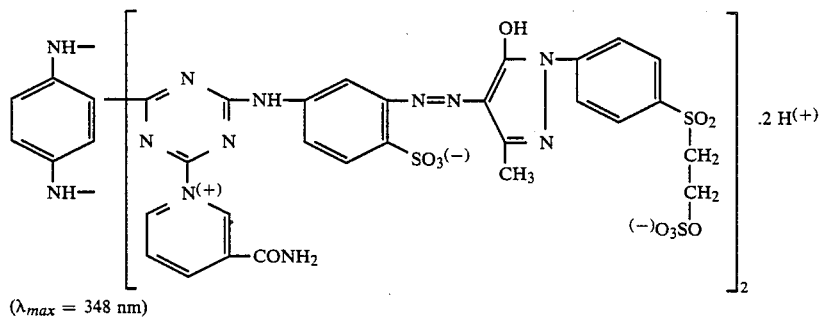

($\lambda_{max}$ = 348 nm)

which has very good fiber-reactive dye properties and is capable for example of dyeing wool or cellulose fiber materials in deep yellow shades by the application and fixing methods customary in the art for fiber-reactive dyes. On cotton, for example, deep neutral yellow dyeings and prints having good fastness properties are obtained (see Application Example 2).

The compound according to the invention can also be used with advantage for dyeing cellulose fiber materials under the conditions of dyeing polyester fibers with disperse dyes, i.e., from an aqueous solution at a pH value of between 5 and 8 and at a temperature between 110° and 130° C. (see Application Example 1).

EXAMPLE 2

A solution of the sodium salt of 37 parts of 4,4'-diaminostilbene-2,2'-disulfonic acid in about 230 parts of water, which has a pH of 6 to 7, is added with thorough stirring to a mixture of 400 parts of ice, 37 parts of cyanuric chloride and 1 part of a commercially available dispersant. The batch is brought to pH 4 to 5 with aqueous sodium carbonate solution and is subsequently stirred at a temperature of 0° to 5° C. for 1 hour.

A neutral solution of the sodium salt of 37.7 parts of 1,3-diaminobenzene-4-sulfonic acid in 300 parts of water is then added, and the reaction mixture is subsequently stirred at a temperature of 40° to 50° C. and a pH value maintained at 4 to 5 for a further three hours. 36 parts of nicotinamide and 10 parts of sodium hydrogenphosphate are then added, and the batch is brought to pH 4 to 5 by means of sodium bicarbonate and is heated at 90° to 110° C. for three hours.

The resulting starting disazo compound of the formula (written in the form of the free acid)

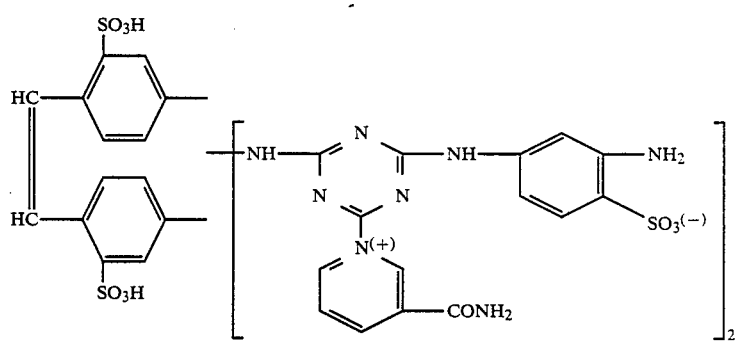

is then diazotized (tetrazotized) in a conventional manner in its synthesis solution, for example, after addition of ice and concentrated aqueous hydrochloric acid to set a pH value of 1, by means of an approximately 40% strength aqueous sodium nitrite solution at a temperature of between 0° and 10° C.; the suspension of the bisdiazonium compound is then brought to pH 5 to 7, an aqueous solution of 106 parts of 1-[3'-(β-chloroethylsulfonyl)-benzoylamino]-8-naphthol-3,6-disulfonic acid is then added, and the coupling reaction is completed in that pH range at a temperature of 10° to 20° C.

The disazo compound according to the invention is salted out with 20% of potassium chloride, based on volume of the synthesis batch, filtered off and dried at 80° C. under reduced pressure. This gives a dark red, electrolyte-containing powder of the alkali metal salt (in particular the potassium salt) of the compound of the formula

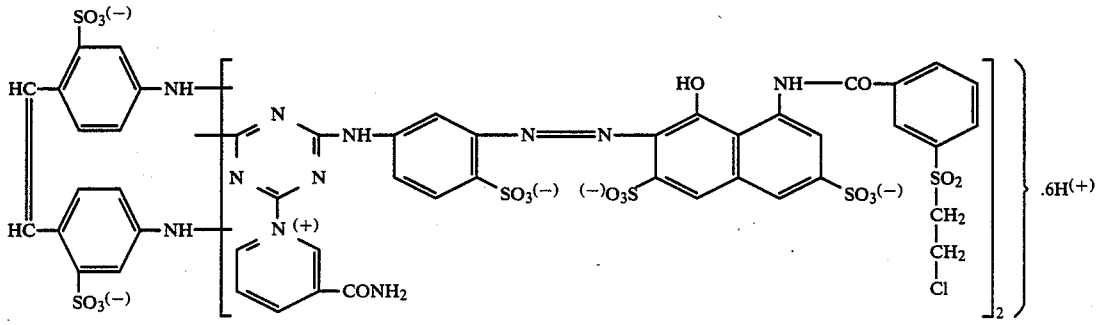

($\lambda_{max}$ = 514 nm).

This compound has very good fiber-reactive dye properties and dyes for example wool or cellulose fiber materials by the aplication and fixing methods customary in the art for fiber-reactive dyes. For example, applied analogously to Application Example 2, it produces on cotton deep bluish red dyeings and prints having good fastness properties, of which in particular the good light fastness properties or dry material or on material impregnated with tapwater or an acid or alkaline aqueous perspiration solution and a good chlorinated water fastness, the good acid and alkaline perspiration fastness properties, the good wash fastness properties, water and crock fastness properties can be singled out.

The compound according to the invention can also be used with advantage for dyeing cellulose fiber materials under the conditions of dyeing polyester fibers with disperse dyes, i.e. from an aqueous solution at a pH value between 5 and 8 and at a temperature between 120° and 150° C. (analogously to Application Example 1), which again produces deep bluish red dyeings having the abovementioned advantageous fastness properties. Even under these dyeing conditions the disazo compound accordng to the invention exhibits a very good color buildup.

acid in 400 parts of water is added with continued stirring, the temperature is allowed to rise to 25° C. and is then raised further to 40° C. in the course of 1 hour, during which the pH is adjusted to a value of 5 and maintained. Stirring is continued at 40° C. for 1 hour, the reaction temperature is then again raised to 50° to 60° C. in the course of a further hour while a pH value between 4 and 5 is maintained, stirring is continued until maintaining this pH range requires no further acid-binding agent (such as sodium bicarbonate), and the reaction mixture is cooled down and diazotized in the conventional manner by means of 40 parts by volume of 39% strength aqueous sodium nitrite solution and 90 parts by volume of aqueous concentrated hydrochloric acid. The batch is subsequently stirred at about 0° to 5° C. for a further 3 hours, and excess nitrite is removed. The coupling component used is 2-(4'-β-sulfato-ethylsulfonylphenylazo)-3,6-disulfo-1-amino-8-naphthol. 183 parts of this monoazo compound are added to the suspension of the diazonium salt, and the coupling reaction is carried out at a pH value between 6 and 7 and at a temperature between 10° and 20° C.

The resulting bis-[(chlorotriazinylamino)-disazo] compound is then reacted in its synthesis solution at a pH value of 4 to 4.5 under reflux with 36.6 parts of nicotinic acid in the course of two hours. The batch is subsequently clarified, and the resultng disazo compound according to the invention is isolated in a conventional manner by salting out or evaporating.

The result obtained is an electrolyte-containing black powder of the alkali metal salt of the compound of the formula

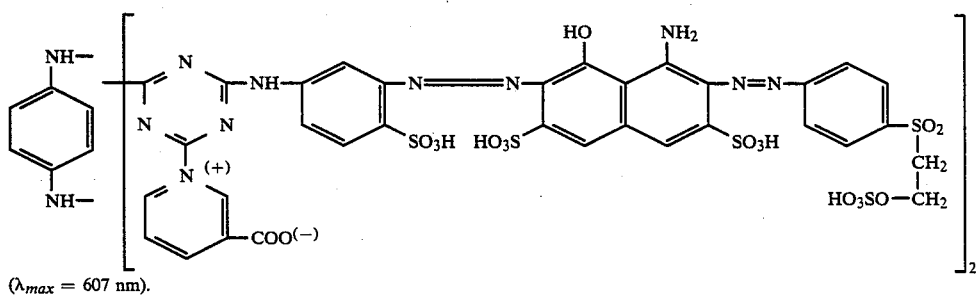

($\lambda_{max}$ = 607 nm).

EXAMPLE 3

21.6 parts of 1,4-diaminobenzene are stirred into a mixture of 500 parts of water, 400 parts of ice, 74 parts of cyanuric chloride and 10 parts of a commercially available dispersant. After 2 hours of stirring a neutral solution of 75.3 parts of 1,3-diaminobenzene-4-sulfonic This compound according to the invention has very good fiber-reactive dye properties and, applied by the methods of the alkaline fixation of fiber-reactive dyes, for example from a long aqueous liquor at 60° to 80° C., in the presence of an alkali, produces on cellulose fiber materials deep navy dyeings having the good fastness properties mentioned hereinafter. If applied from an aqueous dyebath at a temperature between 120° and 130° C. and at a pH value between 5 and 7 in the absence of alkali, the compound according to the invention produces with equal advantage dyeings on cellulose fiber materials in deep navy shades having good fast properties, of which in particular the good light fastness propeties on dry and moist material and the good wet fastness properties, such as in particular good perspiration fastness properties, can be singled out. The compound according to the invention also exhibits a good color buildup.

EXAMPLE 4

19 parts of cyanuric chloride and 18.8 parts of 1,3-diaminobenzene-4-sulfonic acid are stirred with one another in 200 parts of water at 10° C. and at a pH value of 2 to 3. After the condensation reaction has ended, an aqueous solution of 5.5 parts of 1,4-diaminobenzene is added, and stirring is continued at a reaction temperature of 40° to 60° C. and at a pH value of 4 to 6 until starting materials are no longer detectable (this can be done in a conventional manner by chromatography). 18 parts of nicotinic acid are then added, and a third condensation reaction is carried out at 90° C. in the course of several hours during which a pH value between 4 and 5 is maintained.

After the reaction has ended, the batch is cooled down and acidified with hydrochloric acid, and the product is diazotized (tetrazotized) in a conventional manner. To the resulting suspension of this bis-diazonium salt are then added 39 parts of acetoacetyl-[2,5-dimethoxy-4-(β-sulfatoethylsulfonyl)]-anilide; the coupling reaction takes place at a temperature between 10° and 20° C. and at a pH value between 5 and 6.

The disazo compound according to the invention has the formula (written in the form of the free acid)

dyeing liquor at a pH value between 5 and 7 and at a temperature between 110° and 140° C., deep greenish yellow dyeings having good manufacturing and performance fastness properties, of which in particular the good light, wash, perspiration and water fastness properties can be singled out.

EXAMPLE 5

The neutral solution of 68.8 parts of 4,4'-diaminodiphenyl-2,2'-disulfonic acid in 400 parts of water is stirred into a mixture of 400 parts of ice, 100 parts of water and 74 parts of cyanuric chloride in the course of 10 minutes. The batch is subsequently stirred for about half an hour at 0° to 10° C. and at a pH value between 2 and 3. 75.3 parts of 1,4-diaminobenzene-2-sulfonic acid are then added, the pH value is raised to 4.5 to 5.5, and the batch is heated to 45° to 55° C. and is maintained at that temperature and within that pH range until added sodium bicarbonate is no longer consumed.

73.8 parts of nicotinic acid are then added to the batch a pH value of 4 to 4.5 is set with secondary sodium phosphate, and the batch is brought to the boil and is stirred at the boil for a further two hours. The reaction mixture is then cooled down, and the resulting bis-(amino-phenylaminotriazinyl) compound is diazotized in its synthesis solution in a conventional manner at a mineral acid pH value by means of 52.5 parts of a 39% strength aqueous sodium nitrate solution.

In a separate batch, the coupling component is prepared by reacting in succession 95.6 parts of 3-sulfo-6-amino-1-naphthol and 112.4 parts of 3-(β-sulfatoethylsulfonyl)aniline with 80 parts of cyanuric chloride in a conventional manner to give the monochlorotriazinyl condensation product.

The aqueous synthesis solution of this condensation product is if necessary brought to a pH value between 6.5 and 7 and added to the mineral acid diazonium salt

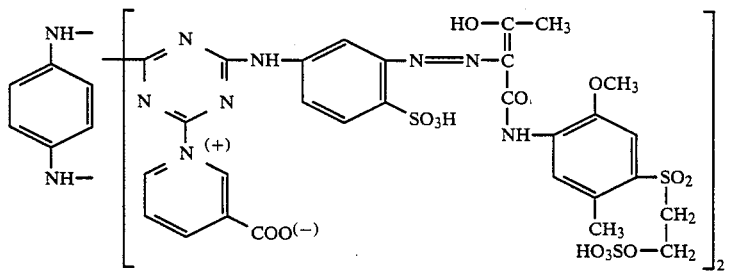

and is isolated in a conventional manner in the form of the alkai metal salt. It exhibits very good fiber-reactive dye properties and produces in particular on cellulose fiber material, for example by the customary application and fixing methods in the presence of an alkali, for example from an alkaline aqueous dyebath at 60° to 80° C., or even in the absence of an alkali from an aqueous solution. The coupling is carried out for three to four hours at a pH value between 5 and 6. The disazo compound according to the invention is salted out from its synthesis solution at 60° C. with potassium chloride and isolated by filtration; written in the form of the free acid it has the formula

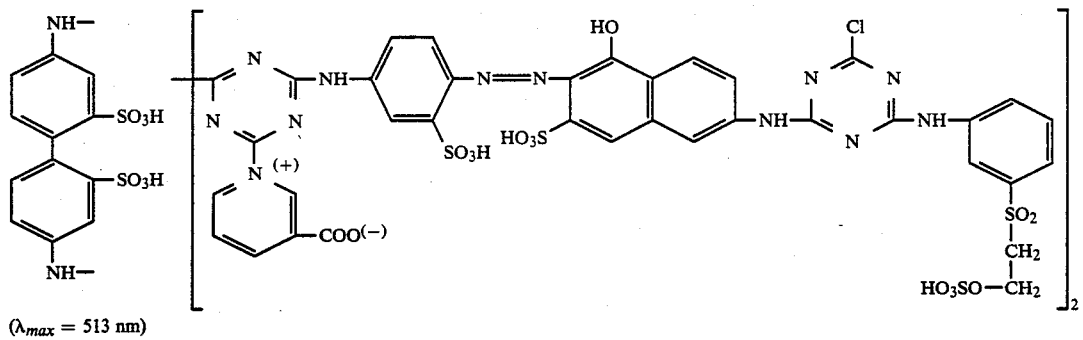

($\lambda_{max}$ = 513 nm)

and also has very good dyeing properties. For instance, on cellulose fiber materials it produces, for example at a pH value between 5 and 8 from an aqueous bath at a temperature between 120° and 130° C. in a dyeing time of 60 to 90 minutes, deep fast scarlet-red shades. Deep scarlet-red fast dyeings are also obtained by the customary methods of dyeing and fixing reactive dyes, for example in an exhaust method at dyeing temperatures between 40° and 80° C. by adding an alkaline agent, such as sodium carbonate and sodium hydroxide solution.

EXAMPLES 6 to 70

The Table Examples which follow describe further disazo compounds according to the invention in terms of the general formula (1) mentioned above by means of its components (the numerical values in brackets in the column headed "hue" are the $\lambda_{max}$ values in nm). They can be prepared in a manner according to the invention, for example in accordance with any one of the above Working Examples, and produce in particular on cellulose fiber materials, such as cotton, by the application and fixing methods customary for fiber-reactive dyes deep fast dyeings and prints having the hue indicated in the particular Table Example. Dyeings on cellulose fiber materials having similarly good tinctorial strength and similarly good fastness properties are also obtainable from an aqueous bath at a temperature between 110° and 140° C. and at a pH value between 5 and 7.5, if desired in the presence of an electrolyte salt, such as sodium sulfate or sodium chloride, and of a buffer mixture for maintaining this pH range. The (C) component indicated in the Table Example corresponds to a radical of the general formula (C) corresponding to the starting diamino compound of the general formula (20):

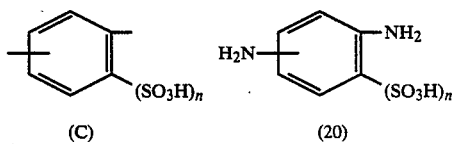

|     |                                | Azo compound of the general formula (1) with ... |                |                                                              |                   |
| --- | ------------------------------ | -------------- | -------------- | ------------------------------------------------------------ | ----------------- |
| Ex. | Component A                    | R              | Component (C)  | Coupling component H-K                                       | Hue on cotton     |
| 6   | 3,3'-Disulfo-diphen-4,4'-ylene | Carboxy        | 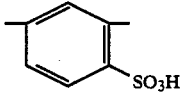 | 1-(4'-β-Sulfatoethyl-sulfonyl-phenyl)-3-methyl-5-pyrazolone | yellow |
| 7   | 1,4-Phenylene                  | Carbamoyl      | "              | 1-(4'-β-Sulfatoethyl-sulfonyl-phenyl)-3-methyl-5-pyrazolone  | yellow (396)      |
| 8   | "                              | Carbamoyl      |  | 1-(4'-β-Sulfatoethyl-sulfonyl-phenyl)-3-methyl-5-pyrazolone | reddish yellow (416) |
| 9   | "                              | Carbamoyl      | "              | 1-(4'-β-Sulfatoethyl-sulfonyl-phenyl)-3-carboxy-5-pyrazolone | reddish yellow    |
| 10  | "                              | Carbamoyl      | 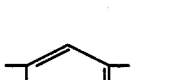 | 1-(4'-β-Sulfatoethyl-sulfonyl-phenyl)-3-carboxy-5-pyrazolone | yellow (397) |
| 11  | 2,2'-Disulfo-stilben-4,4'-ylene | Carboxy       | "              | 1-(3'-β-Sulfatoethyl-sulfonyl-phenyl)-3-carboxy-5-pyrazolone | yellow (398)      |
| 12  | 2,2'-Disulfo-stilben-4,4'-ylene | Carboxy       | "              | 1-(3'-Vinylsulfonyl-phenyl)-3-carboxy-5-pyrazolone           | yellow (390)      |
| 13  | 2,2'-Disulfo-                  | Carboxy        | "              | 1-(3'-Vinylsulfonyl-                                         | yellow            |

-continued

| Ex. | Component A | R | Component (C) | Coupling component H-K | Hue on cotton |
|---|---|---|---|---|---|
| | stilben-4,4'-ylene | | | phenyl)-3-methyl-5-pyrazolone | |
| 14 | 2,2'-Disulfo-stilben-4,4'-ylene | Carboxy | " | 1-(3'-β-Sulfatoethyl-sulfonyl-phenyl)-3-methyl-5-pyrazolone | yellow |
| 15 | 2,2'-Disulfo-stilben-4,4'-ylene | Carboxy | " | 1-(4'-β-Sulfatoethyl-sulfonyl-phenyl)-3-methyl-5-pyrazolone | yellow |
| 16 | 2,2'-Disulfo-stilben-4,4'-ylene | Carbamoyl | " | 1-(4'-β-Sulfatoethyl-sulfonyl-phenyl)-3-methyl-5-pyrazolone | yellow |
| 17 | NH—⌬(SO₃H)—CO—NH—⌬(SO₃H) | Carbamoyl | " | 1-(4'-β-Sulfatoethyl-sulfonyl-phenyl)-3-methyl-5-pyrazolone | yellow |
| 18 | " | Carbamoyl | " | 1-(3'-β-Sulfatoethyl-sulfonyl-pheyl)-3-methyl-5-pyrazolone | yellow |
| 19 | 3,3'-Disulfo-diphenyl-4,4'-ylene | Carbamoyl | " | 1-(4'-β-Sulfatoethyl-sulfonyl-phenyl)-3-methyl-5-pyrazolone | yellow |
| 20 | 3,3'-Disulfo-diphenyl-4,4'-ylene | Carboxy | 1,4-Phenylene | N—(4-β-Sulfatoethyl-sulfonyl)-acetoacetyl-anilide | greenish yellow |
| 21 | 1,4-Phenylene | Carboxy | ⌬—SO₃H | 3-{N—[3'-(β-Chloroethyl-sulfonyl)-benzoyl]-N-methyl}-amino-6-sulfo-8-naphthol | orange |
| 22 | " | Carbamoyl | " | 3-{N—[3'-(β-Chloroethyl-sulfonyl)-benzoyl]-N-methyl}-amino-6-sulfo-8-naphthol | orange |
| 23 | " | Carbamoyl | ⌬—SO₃H | 3-{N—[3'-(β-Chloroethyl-sulfonyl)-benzoyl]-N-methyl}-amino-6-sulfo-8-naphthol | red (508) |
| 24 | 2-Sulfo-1,4-phenylene | Carbamoyl | " | 3-{N—[3'-(β-Sulfatoethyl-sulfonyl)-benzoyl]}-amino-6-sulfo-8-naphthol | red |
| 25 | 2-Sulfo-2,4-phenylene | Carbamoyl | ⌬—SO₃H | 3-{N—[3'-(β-Sulfatoethyl-sulfonyl)-benzoyl]}-amino-6-sulfo-8-naphthol | orange |
| 26 | 2-Sulfo-1,4-phenylene | Carbamoyl | " | 3-{N—[4'-(β-Chloroethyl-sulfonyl)-methyl-benzoyl]}-amino-6-sulfo-8-naphthol | orange |
| 27 | 2-Sulfo-1,4-phenylene | Carboxy | " | 3-{N—[4'-(β-Chloroethyl-sulfonyl)-methyl-benzoyl]}-amino-6-sulfo-8-naphthol | orange |
| 28 | 2-Sulfo-1,4-phenylene | Carboxy | " | 2-{N—[4'-(β-Chloroethyl-sulfonyl)-methyl-benzoyl]}-amino-6-sulfo-8-naphthol | bluish red |
| 29 | 2,2'-Disulfo-stilben-4,4'-ylene | Carboxy | " | 2-{N—[4'-(β-Chloroethyl-sulfonyl)-methyl-benzoyl]}-amino-6-sulfo-8-naphthol | bluish red |

-continued

| | | Azo compound of the general formula (1) with ... | | | |
|---|---|---|---|---|---|
| Ex. | Component A | R | Component (C) | Coupling component H-K | Hue on cotton |
| 30 | 2,2'-Disulfo-stilben-4,4'-ylene | Carbamoyl | " | 3-[4'-(4"-β-Sulfato-ethylsulfonyl)-phenyl-amino-2'-chloro-s-triazin-6'-yl]-amino-6-sulfo-8-naphthol | orange |
| 31 | 2,2'-Disulfo-stilben-4,4'-ylene | Carboxy | " | 3-[4'-(4"-β-Sulfato-ethylsulfonyl)-phenyl-amino-2'-chloro-s-triazin-6'-yl]-amino-6-sulfo-8-naphthol | orange |
| 32 | 2,2'-Disulfo-stilben-4,4'-ylene | Carbamoyl | " | 3-[4'-(4"-β-Sulfato-ethylsulfonyl)-phenyl-amino-2'-chloro-s-triazin-6'-yl]-amino-6-sulfo-8-naphthol | orange |
| 33 | 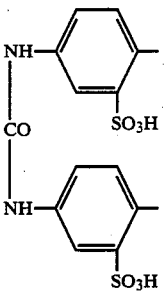 | Carbamoyl | " | 3-[4'-(4"-β-Sulfato-ethylsulfonyl)-phenyl-amino-2'-chloro-s-triazin-6'-yl]-amino-6-sulfo-8-naphthol | orange |
| 34 | 2,2'-Disulfo-stilben-4,4'-ylene | Carboxy | " | 3-{N—[4'-(4"-β-Sulfato-ethylsulfonyl)-phenyl-amino-2'-chloro-s-triazin-6'-yl]-N—methyl-amino)-6-sulfo-8-naphthol | orange |
| 35 | 1,4-Phenylene | Carbamoyl | " | 1-{N—[3'-(β-Chloroethyl-sulfonyl)-benzoyl]}-amino-3,6-disulfo-8-naphthol | violet |
| 36 | " | Carboxy | " | 1-(N—[3'-(β-Chloroethyl-sulfonyl)-benzoyl]}-amino-3,6-disulfo-8-naphthol | violet |
| 37 | 1,4-Phenylene | Carbamoyl | " | 1-{N—[3'-(β-Chloroethyl-sulfonyl)-benzoyl]}-amino-4,6-disulfo-8-naphthol | bluish red |
| 38 | " | Carbamoyl | " | 1-{N—[4'-(β-Chloroethyl-sulfonyl)-methyl-benzoyl]}-amino-3,6-disulfo-8-naphthol | violet |
| 39 | " | Carbamoyl | " | 1-{N—[4'-(4"-β-Sulfato-ethylsulfonyl)-phenyl-amino-2'-chloro-s-triazin-6'-yl]}-amino-3,6-disulfo-8-naphthol | violet |
| 40 | " | Carboxy | " | 1-{N—[4'-(4"-β-Sulfato-ethylsulfonyl)-phenyl-amino-2'-chloro-s-triazin-6'-yl]}-amino-3,6-disulfo-8-naphthol | violet |
| 41 | 2,2'-Disulfo-stilben-4,4'-ylen | Carboxy | " | 1-{N—[4'-(4"-β-Sulfato-ethylsulfonyl)-phenyl-amino-2'-chloro-s-triazin-6'-yl]}-amino-3,6-disulfo-8-naphthol | violet |
| 42 | 2,2'-Disulfo-stilben-4,4'-ylen | Carbamoyl | " | 1-{N—[4'-(4"-β-Sulfato-ethylsulfonyl)-phenyl-amino-2'-chloro-s-triazin-6'-yl]}-amino-3,6-disulfo-8-naphthol | violet |
| 43 | " | Carbamoyl | " | 1-{N—[4'-(4"-β-Sulfato-ethylsulfonyl)-phenyl-amino-2'-chloro-s-triazin-6'-yl]}-amino-4,6-disulfo-8-naphthol | bluish red |
| 44 | " | Carbamoyl | " | 1-{N—[3'-(4"-β-Sulfato-ethylsulfonyl)-phenyl- | violet |

-continued

| Ex. | Component A | R | Component (C) | Coupling component H-K | Hue on cotton |
|---|---|---|---|---|---|
| | | | | amino-2'-chloro-s-triazin-6'-yl]}-amino-3,6-disulfo-8-naphthol | |
| 45 | ![structure: two NH-phenyl-SO3H groups linked by CO] | Carbamoyl | " | 1-{N—[3'-(4"-β-Sulfato-ethylsulfonyl)-phenyl-amino-2'-chloro-s-triazin-6'-yl]}-amino-3,6-disulfo-8-naphthol | violet |
| 46 | " | Carboxy | " | 1-{N—[3'-(4"-β-Sulfato-ethylsulfonyl)-phenyl-amino-2'-chloro-s-triazin-6'-yl]}-amino-3,6-disulfo-8-naphthol | violet |
| 47 | 3,3'-Disulfo-diphen-4,4'-ylene | Carboxy | " | 1-{N—[3'-(4"-β-Sulfato-ethylsulfonyl)-phenyl-amino-2'-chloro-s-triazin-6'-yl]}-amino-3,6-disulfo-8-naphthol | violet |
| 48 | 1,4-Phenylene | Carbamoyl | " | 2-[4'-(β-Sulfatoethyl-sulfonyl)-phenyl]-azo-3,6-disulfo-1-amino-8-naphthol | navy |
| 49 | " | Carboxy | " | 2-[4'-(β-Sulfatoethyl-sulfonyl)-phenyl]-azo-3,6-disulfo-1-amino-8-naphthol | navy |
| 50 | " | Carboxy | ![phenyl-SO3H] | 2-[4'-(β-Sulfatoethyl-sulfonyl)-phenyl]-azo-3,6-disulfo-1-amino-8-naphthol | greenish blue |
| 51 | " | Carboxy | ![phenyl-SO3H] | 2-[4'-(β-Sulfatoethyl-ssulfonyl)-2'-bromo-phenyl]-azo-3,6-disulfo-1-amino-8-naphthol | navy |
| 52 | " | Carboxy | " | 2-[6'-(β-Sulfatoethyl-sulfonyl)-1'-sulfo-naphth-2'-yl]-azo-3,6-disulfo-1-amino-8-naphthol | navy |
| 53 | 2,2'-Disulfo-stilben-4,4'-ylene | Carbamoyl | " | 2-[4'-(β-Sulfatoethyl-sulfonyl)-phenyl]-azo-3,6-disulfo-1-amino-8-naphthol | navy (608) |
| 54 | 2,2'-Disulfo-stilben-4,4'-ylene | Carboxy | " | 2-[4'-(β-Sulfatoethyl-sulfonyl)-phenyl]-azo-3,6-disulfo-1-amino-8-naphthol | navy (610) |
| 55 | 2,2'-Disulfo-stilben-4,4'-ylene | Carboxy | " | 2-[4'-Vinylsulfonyl-phenyl]-azo-3,6-disulfo-1-amino-8-naphthol | navy |

-continued

| Ex. | Component A | R | Component (C) | Coupling component H-K | Hue on cotton |
|---|---|---|---|---|---|
| 56 | [structure: NH-phenyl-SO₃H, CO, NH-phenyl-SO₃H] | Carboxy | " | 2-[4'-Vinylsulfonyl-phenyl]-azo-3,6-disulfo-1-amino-8-naphthol | navy |
| 57 | " | Carbamoyl | " | 2-[4'-Vinylsulfonyl-phenyl]-azo-3,6-disulfo-1-amino-8-naphthol | navy |
| 58 | 2,2'-Disulfo-diphen-4,4'-ylene | Carbamoyl | " | 2-[4'-Vinylsulfonyl-phenyl]-azo-3,6-disulfo-1-amino-8-naphthol | navy |
| 59 | 2,2'-Disulfo-diphen-4,4'-ylene | Carbamoyl | " | 2-[4'β-Sulfatoethyl-sulfonyl)-phenyl]-azo-3,6-disulfo-1-amino-8-naphthol | navy |
| 60 | 3,3'-Disulfo-diphen-4,4'-ylene | Carbamoyl | " | 2-[4'β-Sulfatoethyl-sulfonyl)-phenyl]-azo-3,6-disulfo-1-amino-8-naphthol | navy |
| 61 | 3,3'-Disulfo-diphen-4,4'-ylene | Carboxy | [phenyl-SO₃H] | 2-[4'-(β-Sulfatoethyl-sulfonyl)phenyl]-azo-4,6-disulfo-1-amino-8-naphthol | navy |
| 62 | 1,4-Phenylene | Carbamoyl | [phenyl-SO₃H] | N—(4-β-Sulfatoethyl-sulfonyl)-acetoacetyl-anilide | greenish yellow |
| 63 | " | Carboxy | " | N—(4-β-Sulfatoethyl-sulfonyl)-acetoacetyl-anilide | greenish yellow |
| 64 | " | Carboxy | " | N—[2-Methyl-5-methoxy-4-(β-sulfatoethyl-sulfonyl)]-acetoacetyl-anilide | greenish yellow |
| 65 | 2,2'-Disulfo-stilben-4,4'-ylene | Carboxy | " | N—(4-β-Sulfatoethyl-sulfonyl)-acetoacetyl-anilide | greenish yellow |
| 66 | 2,2'-Disulfo-stilben-4,4'-ylene | Carboxy | [phenyl-SO₃H] | N—(4-β-Sulfatoethyl-sulfonyl)-acetoacetyl-anilide | greenish yellow |
| 67 | 2,2'-Disulfo-stilben-4,4'-ylene | Carbamoyl | " | N—(4-β-Sulfatoethyl-sulfonyl)-acetoacetyl-anilide | greenish yellow |
| 68 | 2,2'-Disulfo-diphen-4,4'-ylene | Carbamoyl | [phenyl-SO₃H] | N—(4-β-Sulfatoethyl-sulfonyl)-acetoacetyl-anilide | greenish yellow |
| 69 | 2,2'-Disulfo-diphen-4,4'-ylene | Carboxy | " | N—(4-β-Sulfatoethyl-sulfonyl)-acetoacetyl-anilide | greenish yellow |
| 70 | 3,3'-Disulfo-diphen-4,4'-ylene | Carboxy | " | N—(4-β-Sulfatoethyl-sulfonyl)-acetoacetyl-anilide | greenish yellow |

APPLICATION EXAMPLE 1

50 parts of a cotton fabric are introduced into a dye bath composed of 1 part of the disazo compound according to the invention of Example 1 (in the form of a neutral salt), 50 parts of anhydrous sodium sulfate, 800 parts of water and 200 parts of an aqueous buffer solution prepared from 200 parts of water and 20 parts of 85% strength phosphoric acid and brought to pH 6 with sodium hydroxide solution. The fabric is treated in the bath at a temperature of 130° C. with constant agitation for 90 minutes. The dyeing obtained is then aftertreated by rinsing with warm and with hot water, by washing in an aqueous bath composed of 1,500 parts of water and 1.5 parts of a non-ionic agent at the boil for 15 minutes, and rinsing again with warm water, and dried.

The result obtained is a deep yellow dyeing which has a good light fastness on dry and moist fabric, including a good acid and alkali perspiration light fastness, and good wet fastness properties, such as a good water, 60° C. and 95° C. wash, perspiration and chlorinated water fastness, and also a good crock fastness. In addition the compound according to the invention exhibits a good color buildup in this dyeing process.

If the dyeing process is carried out not at pH 6 but at pH 5, pH 7 or pH 8, similar yellow dyeings having virtually the same depth of shade as the dye prepared at pH 6 are obtained.

APPLICATION EXAMPLE 2

If the disazo compound according to the invention of Example 1 is used for dyeing cellulose fiber material, such as cotton fabric, in a dyeing method customary for fiber-reactive dyes, for example in an exhaust method at a temperature of 60° C. or 80° C. in the presence of alkaline agent, such as sodium carbonate and sodium hydroxide solution, and of an electrolyte salt such as sodium sulfate, this likewise produces very deep yellow dyeings having good fastness properties, of which in particular the good light fastness on dry and moist fabric, including a good perspiration light fastness, and also the good crock fastness and the good water, wash, perspiration and chlorinated water fastness properties can be singled out.

APPLICATION EXAMPLE 3

A dyebath is prepared from 80 parts of water, 1 part of the disazo compound according to the invention of Example 3, 50 parts of anhydrous sodium sulfate and 1 part of sodium m-nitrobenzenesulfonate, and is brought to a pH value of 6, and 3 parts of a disperse dye Color Index Disperse Blue 79 are added.

This dyeing liquor is entered with 50 parts of a polyester/cotton blend fabric (50:50), the dyebath is heated to a temperature of 130° C. in the course of 30 minutes, and the dyeing is continued at 130° C. for a further 60 minutes. The dyed fabric is then taken out of the dyeing liquor, aftertreated and finished (for example as described in Application Example 1). The result obtained is a uniformly and deeply dyed fabric in navy where both the fiber portions are fully penetrated. The dyeing has the good fastness properties of the cotton dyeings of the dye according to the invention of Example 3 (cf. Application Example 4) and of the polyester dyeings of a known disperse dye.

APPLICATION EXAMPLE 4

A dye bath is prepared from 59 parts of water, 1 part of the disazo compound according to the invention of Example 3, 50 parts of anhydrous sodium sulfate and 5 parts of phosphoric acid, and the bath is brought to pH 4.5 with sodium carbonate. 50 parts of a cotton fabric are then introduced, and the dyeing is carried out in a sealed apparatus at a dyeing temperature of 140° C. by constantly agitating for 30 minutes. The dyed fabric is then removed and finished by rinsing with hot and cold water, by treatment at the boil for 15 minutes in an aqueous bath containing a small amount of a nonionic detergent, by rinsing again with water and drying.

The result obtained is a deep navy cotton fabric having very good fastness properties, such as in particular a good light fastness on dry and moist fabric, good perspiration light fastness properties and good perspiration fastness properties. If different amounts of the dye are used, the disazo compound according to the invention exhibits a good color buildup.

We claim:

1. A water-soluble azo compound which conforms to the formula

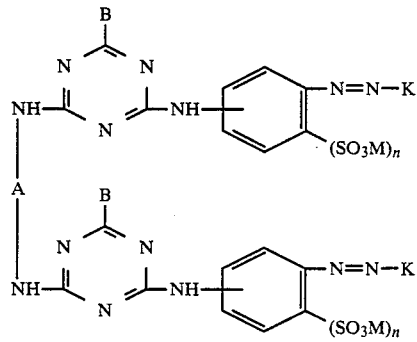

in which

A is phenylene unsubstituted or substituted by 1 or 2 substituents selected from the group consisting of alkoxy of 1 to 4 carbon atoms, alkyl of 1 to 4 carbon atoms, chlorine, sulfo and carboxy, or A is a group of the formula

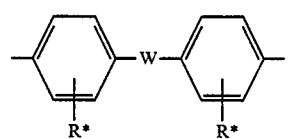

in which

W is a direct bond or a vinylidene group of the formula —CH=CH— or a group of the formula —NH—CO—NH— and R* is hydrogen or nitro, sulfo, carboxy, methyl, ethyl, methoxy or ethoxy;

B is a pyridinium group of the formula

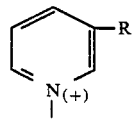

(3)

in which
R is carboxy or carbamoyl;
n is zero or 1;
M is hydrogen or an alkali metal;
K is a group of the formula

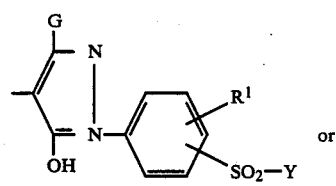 or

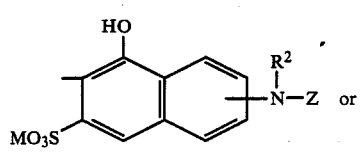 or

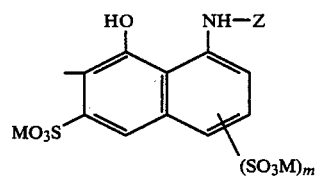

or is

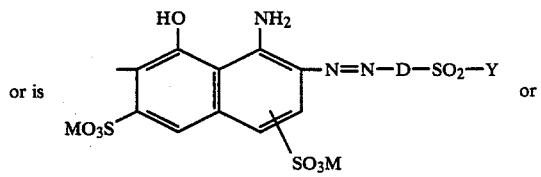 or

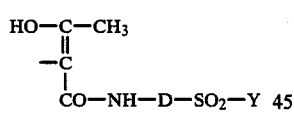

in which
D is phenylene unsubstituted or substituted by 1 or 2 substituents selected from the group consisting of chlorine, bromine, alkyl of 1 to 4 carbon atoms, alkoxy of 1 to 4 carbon atoms, carboxy and sulfo, or is naphthylene unsubstituted or substituted by 1 or 2 sulfos;

$R^1$ is hydrogen, chlorine, alkyl group of 1 to 4 carbon atoms or alkoxy of 1 to 4 carbon atoms;
$R^2$ is hydrogen or alkyl of 1 to 4 carbon atoms;
G is carboxy, methyl or carbalkoxy of 2 to 5 carbon atoms;
Y is a vinyl, β-sulfatoethyl or β-chloroethyl;
M has the abovementioned meaning;
m is zero or 1;
Z is α- or β-bromoacryloyl or is β-chloropropionyl, β-chloroethylsulfonylbenzoyl or (β-chloroethylsulfonylmethyl)-benzoyl or a group of the formula

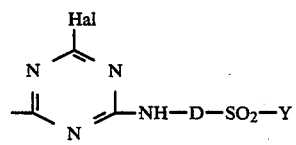

in which D and Y have the abovementioned meanings and Hal is chlorine or fluorine;
one of the sulfo, sulfato and carboxy groups forms an anion equivalent to the pyridinium cation.

2. An azo compound according to claim 1, wherein A is para-phenylene or a sulfo-substituted para-phenylene or a 2,2'- or 3,3'-disulfodiphen-4,4'-ylene or a group of the formula

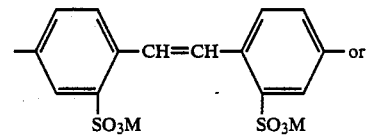 or

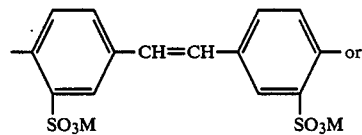 or

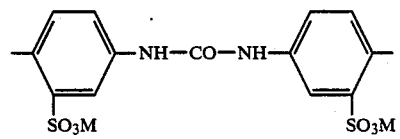

in which M has the meaning mentioned in claim 1.

3. A compound according to claim 1, wherein X is β-sulfatoethyl.

4. A compound according to claim 2, wherein X is β-sulfatoethyl.

* * * * *